Patented Oct. 30, 1923.

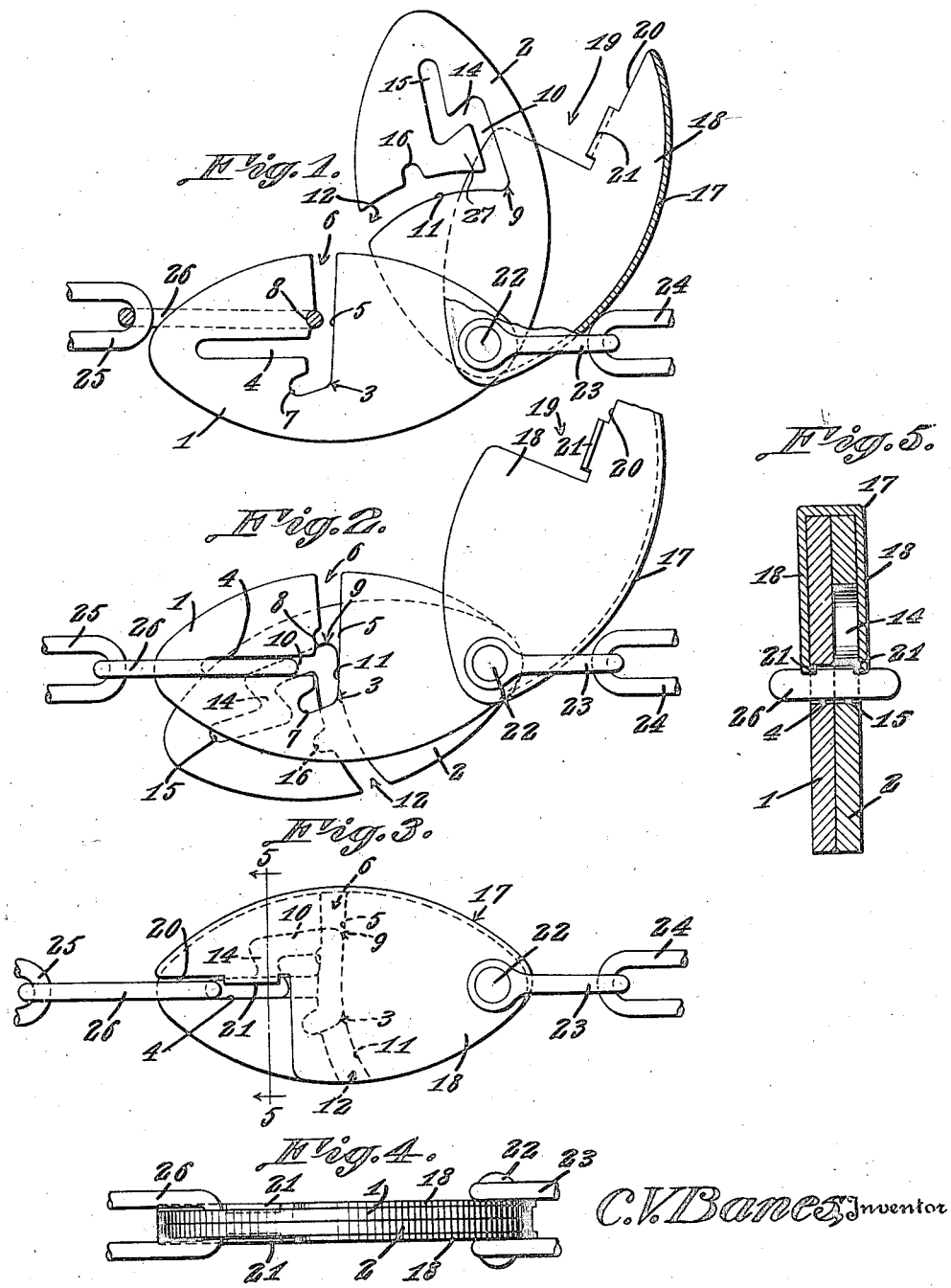

1,472,038

UNITED STATES PATENT OFFICE.

CHESLEY V. BANES, OF KINROSS, IOWA.

FASTENER FOR AUTOMOBILE CHAINS.

Application filed December 17, 1921. Serial No. 523,130.

*To all whom it may concern:*

Be it known that I, CHESLEY V. BANES, a citizen of the United States, residing at Kinross, in the county of Keokuk and State of Iowa, have invented a new and useful Fastener for Automobile Chains, of which the following is a specification.

This invention aims to provide novel means whereby the ends of a chain or other flexible element may be connected releasably but securely, novel means being provided for shielding and protecting the constituent parts of the device, the structure being of peculiar utility in connection with automobile skid chains, although the fastener, of course, may be used wherever desired.

Figure 1 shows in elevation, a fastener constructed in accordance with the invention, the same being open; Figure 2 is an elevation showing the fastener in the position which it will assume during the coupling up of the chain or other flexible element; Figure 3 is an elevation showing the fastener closed; Figure 4 is an elevation wherein the fastener is viewed edgewise; Figure 5 is a cross section on the line 5—5 of Figure 3.

The fastener forming the subject matter of this application includes a first member 1 in the form of a plate, having an approximately L-shaped slot 3 including a longitudinal shank 4 and a transverse head 5, the head 5 opening through one edge of the member 1 as shown at 6, a seat 7 being formed in the member 1 at the inner end of the head 5. A seat 8 communicates with the head 5 of the slot 3 and is located between the shank 4 and the mouth 6.

The fastener comprises a second member 2, corresponding in shape to the member 1 and provided with an approximately L-shaped slot 9 including a longitudinal shank 10 and a transverse head 11, the head 11 opening at 12 through one edge of the member 2. The shank 10 of the slot 9 is prolonged to form a transverse arm 14 communicating with a longitudinal extension 15. The parts 14, 10 and 11 of the slot 9 define an internal projection 27 in the member 2. The member 2 is supplied with a seat 16, located between the mouth 12 and the shank 10 of the slot 9.

The numeral 17 denotes a cover including resilient side walls 18, cut away as at 19 to form longitudinal edges 20 having inwardly extended latch fingers 21. The members 1 and 2 are adapted to be received in the cover 17, the said members and the side walls 18 of the cover being connected by a pivot element 22 which may carry a clevis 23 connected to one link 24 of the chain 25, the chain comprising a terminal link 26.

In practical operation, assuming that the parts are in the position shown in Figure 1, the link 26 is passed into the head 5 of the slot 3 in the member 1, through the mouth 6, and is engaged in the seat 8 of the member 1. The member 2 is then swung into the position of Figure 2, the shank 10 of the slot 9 in the member 2 being brought into approximate registration with the shank 4 of the slot 3 in the member 1, of the link 26 being passed into the shank portions 4 and 10 of the slots. The members 1 and 2 then are brought side by side, as in Figure 3, the shank 4 of the slot 3 in the member 1 being brought into registration with the extension 15 of the slot 9 in the member 2, the link 26 passing into the alined slot parts 4 and 5, through the part 14 of the slot 9 in the member 1, and the projection 27 of the member 2 extending across the shank 4 of the slot 3 in the member 1, so that the link 26 cannot move backwardly into the head 5 of the slot 3. The cover 17 may be omitted, but if the cover is used, it is swung to closed position, as in Figure 3, the walls 18 of the cover yielding to permit the fingers 21 to snap into the slot parts 4 and 15. The cover 17 thus is held releasably in closed position, and, if the material out of which the link 26 is made is sufficiently small in diameter, the fingers 21 will prevent the link from backing into the head 5 of the slot 3. Should it be desired to shorten the chain of which the links 26 and 24 form a part, as compared with the length of the chain when the fastener is in the position shown in Figure 3, the link 26 is brought to the inner end of the head 5 of the slot 3 of the member 1 (Figure 1), and the member 2 is disposed by the side of the member 1, thereby locating the seat 16 of the member 2 in registration with the seat 7 of the member 1, whereupon the link 26 may be engaged in the registering seats 16 and 7.

Having thus described the invention, what is claimed is:—

1. A fastener comprising pivotally connected first and second members, each of said members being provided with an approximately L-shaped slot, each slot comprising a transverse head and a longitudinal shank, the heads of the slots opening at one end through opposite edges of the members, the shank of the slot in the second member having a transverse arm opening into a longitudinal extension, the extension being adapted to be brought into registration with the shank of the slot in the first member, and a cover pivoted to said members and carrying a latch which is engaged in the shank of the slot of the first member when the fastener is closed.

2. A fastener comprising pivotally connected first and second members, each of said members being provided with an approximately L-shaped slot, each slot comprising a transverse head and a longitudinal shank, the heads of the slots opening at one end through opposite edges of the members, the shank of the slot in the second member having a transverse arm opening into a longitudinal extension, the extension being adapted to be brought into registration with the shank of the slot in the first member, and a cover pivoted to said members and carrying a latch which is engaged in the extension of the slot in the second member when the fastener is closed.

3. A fastener comprising pivotally connected first and second members, each of said members being provided with an approximately L-shaped slot, each slot comprising a transverse head and a longitudinal shank, the heads of the slots opening at one end through opposite edges of the members, the shank of the slot in the second member having a transverse arm opening into a longitudinal extension, the extension being adapted to be brought into registration with the shank of the slot in the first member, each of said members being provided with a seat communicating with the head of the slot, the seats being spaced from the outer end of the shank of the slot in the first member, and from the outer end of the extension of the slot in the second member, when the fastener is closed, and being so located as to be brought into registration when the fastener is closed.

In testimony that I claim the foregoing as my own, I have hereto affixed my signature in the presence of two witnesses.

CHESLEY V. BANES.

Witnesses:
J. C. SHAFER,
SAM SHAFER.